(12) United States Patent
Zhang et al.

(10) Patent No.: US 11,514,263 B2
(45) Date of Patent: Nov. 29, 2022

(54) METHOD AND APPARATUS FOR PROCESSING IMAGE

(71) Applicant: Beijing Baidu Netcom Science And Technology Co., LTD., Beijing (CN)

(72) Inventors: Wei Zhang, Beijing (CN); Xiao Tan, Beijing (CN); Hao Sun, Beijing (CN); Shilei Wen, Beijing (CN); Errui Ding, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 148 days.

(21) Appl. No.: 16/869,024

(22) Filed: May 7, 2020

(65) Prior Publication Data

US 2021/0064919 A1  Mar. 4, 2021

(30) Foreign Application Priority Data

Aug. 27, 2019  (CN) .......................... 201910796565.8

(51) Int. Cl.
| | |
|---|---|
| *G06K 9/62* | (2022.01) |
| *G06N 3/04* | (2006.01) |
| *G06N 3/08* | (2006.01) |
| *G06V 10/44* | (2022.01) |
| *G06V 10/80* | (2022.01) |
| *G06V 10/82* | (2022.01) |
| *G06V 40/16* | (2022.01) |

(Continued)

(52) U.S. Cl.
CPC ............. *G06K 9/6232* (2013.01); *G06N 3/04* (2013.01); *G06N 3/08* (2013.01); *G06V 10/22* (2022.01); *G06V 10/44* (2022.01); *G06K 9/629* (2013.01)

(58) Field of Classification Search
CPC ........ G06K 9/6232; G06K 9/629; G06N 3/04; G06N 3/08; G06N 3/0454; G06V 10/22; G06V 10/44; G06V 10/454; G06V 10/82; G06V 40/165; G06V 10/267
See application file for complete search history.

(56) References Cited

U.S. PATENT DOCUMENTS

2017/0270653 A1* 9/2017 Garnavi ................. G06T 7/0002
2018/0365532 A1* 12/2018 Molchanov ............ G06N 3/084
2019/0378242 A1* 12/2019 Zhang ................... G06T 3/4061

FOREIGN PATENT DOCUMENTS

| CN | 106682664 A | 5/2017 |
|---|---|---|
| CN | 107577758 A | 1/2018 |

(Continued)

OTHER PUBLICATIONS

Chinese Office Action dated Aug. 6, 2021 issued in CN Application No. 201910796565.8.

(Continued)

*Primary Examiner* — John W Lee
(74) *Attorney, Agent, or Firm* — Weaver Austin Villeneuve & Sampson LLP

(57) ABSTRACT

Embodiments of the present disclosure disclose a method and apparatus for processing an image. A specific embodiment of the method includes: acquiring a feature map of a target image, where the target image contains a target object; determining a local feature map of a target size in the feature map; combining features of different channels in the local feature map to obtain a local texture feature map; and obtaining location information of the target object based on the local texture feature map.

9 Claims, 5 Drawing Sheets

(51) Int. Cl.
    *G06V 10/26*     (2022.01)
    *G06V 10/22*     (2022.01)

(56) References Cited

FOREIGN PATENT DOCUMENTS

| CN | 109086768 A | 12/2018 | |
|---|---|---|---|
| CN | 110110617 A | 8/2019 | |
| WO | WO-2018111786 A1 * | 6/2018 | ........... G06N 3/0454 |

OTHER PUBLICATIONS

Hou et al., "Visual Object Tracking Based on Deep Features and Correlation Filter," Journal of South-Central University for Nationalities (Nat. Sci. Edition), China Academic Journal Electronic Publishing House, vol. 37 No. 2, Jun. 2018, 7 pages, http://www.cnki.new.

Chen et al., "SCA-CNN: Spatial and Channel-wise Attention in Convolutional Networks for Image Captioning," arXiv:1611.05594v2 [cs.CV], Apr. 12, 2017, 9 pages.

Liu et al., An Automatic Method Using Hybrid Neural Networks and Attention Mechanism for Software Bug Triaging, Journal of Computer Research and Development, DOI: 10.7544/issn1000-1239.2020.20190606 57(3), 2020, 13 pages.

\* cited by examiner

METHOD AND APPARATUS FOR PROCESSING IMAGE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, specifically to the field of Internet technology, and more specifically to a method and apparatus for processing an image.

BACKGROUND

With the development of image processing technology, a variety of technologies that may be used for semantic analysis on images have emerged. In the related technologies, images may be processed using image detection technology, image recognition technology, or the like.

For example, different semantic regions in an image may be segmented by using a model for detecting an image. For example, the model may be a convolutional neural network.

SUMMARY

Embodiments of the present disclosure provide a method and apparatus for processing an image.

In a first aspect, an embodiments of the present disclosure provides a method for processing an image, including: acquiring a feature map of a target image, where the target image contains a target object; determining a local feature map of a target size in the feature map; combining features of different channels in the local feature map to obtain a local texture feature map; and obtaining location information of the target object based on the local texture feature map.

In some embodiments, the combining features of different channels in the local feature map to obtain a local texture feature map includes: multiplying, for a feature of each channel, the feature of the channel by the features of respective channels at each pixel in the local feature map, or multiplying the feature of the channel by features of other channels; determining a sum of products corresponding to the pixel; and generating the local texture feature map composed of sums corresponding to respective pixels.

In some embodiments, the obtaining location information of the target object based on the local texture feature map includes: processing the local texture feature map through a pre-trained deep neural network to obtain location information of a region composed of pixels where the target object is located in the target image, where the deep neural network is used to characterize the corresponding relationship between the target image and the location information of the region composed of pixels where the target object contained in the target image is located.

In some embodiments, the deep neural network comprises a combined processing layer; and the determining a local feature map of a target size in the feature map includes: determining the local feature map of the target size in the feature map by using the combined processing layer; and the combining features of different channels in the local feature map to obtain a local texture feature map includes: combining the features of different channels in the local feature map by using the combined processing layer to obtain the local texture feature map.

In some embodiments, the acquiring a feature map of a target image includes: inputting the target image into the pre-trained deep neural network, and using an output of a target convolutional layer of the deep neural network as the feature map.

In a second aspect, an embodiments of the present disclosure provides an apparatus for processing an image, including: an acquiring unit, configured to acquire a feature map of a target image, wherein the target image contains a target object; a determining unit, configured to determine a local feature map of a target size in the feature map; a combining unit, configured to combine features of different channels in the local feature map to obtain a local texture feature map; and a location determining unit, configured to obtain location information of the target object based on the local texture feature map.

In some embodiments, the combining unit includes: a first module configured to multiply, for a feature of each channel, the feature of the channel by the features of respective channels at each pixel in the local feature map, or multiply the feature of the channel by the features of other channels, and determine a sum of products corresponding to the pixel; and a second module configured to generate the local texture feature map composed of sums corresponding to respective pixels.

In some embodiments, the location determining unit is further configured to: process the local texture feature map through a pre-trained deep neural network to obtain location information of a region composed of pixels where the target object is located in the target image, wherein the deep neural network is used to characterize the corresponding relationship between the target image and the location information of the region composed of pixels where the target object contained in the target image is located.

In some embodiments, the deep neural network comprises a combined processing layer; and the determining unit is further configured to: determine the local feature map of the target size in the feature map by using the combined processing layer; and the combining unit is further configured to: combine the features of different channels in the local feature map by using the combined processing layer to obtain the local texture feature map.

In some embodiments, the acquiring unit is further configured to: input the target image into the pre-trained deep neural network, and use an output of a target convolutional layer of the deep neural network as the feature map.

In a third aspect, an embodiments of the present disclosure provides an electronic device, including: one or more processors; and a storage apparatus, storing one or more programs, where the one or more programs, when executed by the one or more processors, cause the one or more processors to implement the method according to any embodiment in the method for processing an image.

In a fourth aspect, an embodiments of the present disclosure provides a computer-readable storage medium, storing a computer program thereon, where the computer program, when executed by a processor, causes the processor to implement the method according to any embodiment in the method for processing an image.

According to the image processing solution provided by embodiments of the present disclosure, a feature map of a target image is first acquired, where the target image contains a target object. Thereafter, a local feature map of a target size is determined in the feature map. Then, features of different channels in the local feature map are combined to obtain a local texture feature map. Finally, location information of the target object is obtained based on the local texture feature map. The embodiments of the present disclosure can combine the features of different channels, so that the features of respective channels can be fused, and the combined features are richer and may better reflect the characteristics of the image. Therefore, more accurate location detection results can be obtained by using the combined features.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
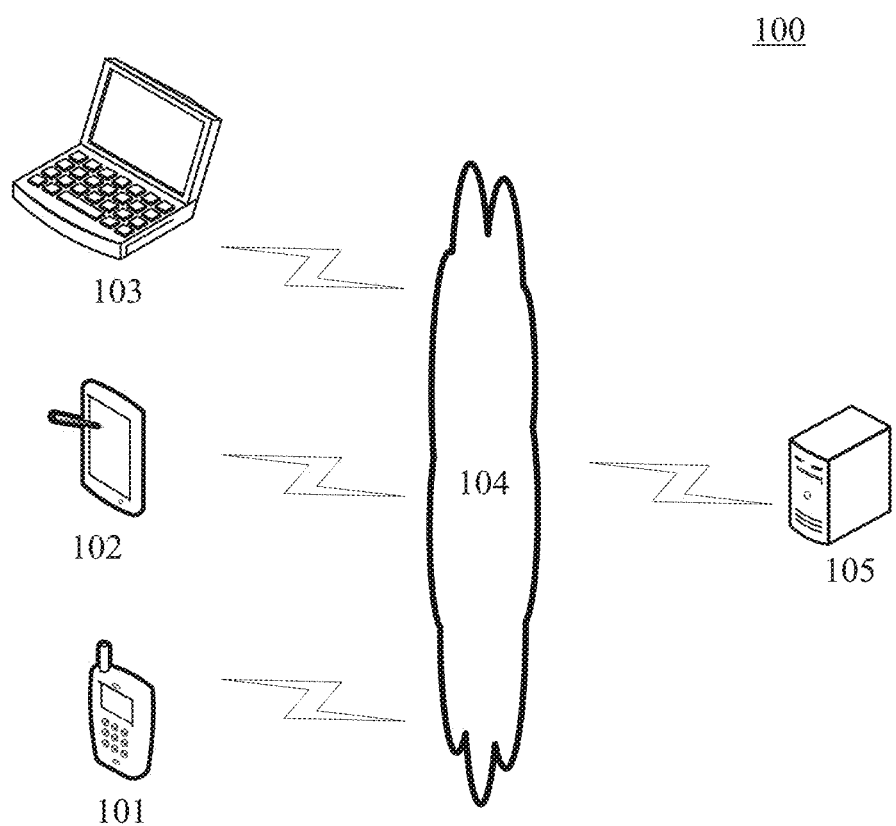
FIG. 1 is an architectural diagram of an exemplary system to which some embodiments of the present disclosure may be applied.

FIG. 1 shows an exemplary system architecture 100 to which a method for processing an image or an apparatus for processing an image according to an embodiment of the present disclosure may be applied.

As shown in FIG. 1, the system architecture 100 may include a terminal devices 101, 102 and 103, a network 104, and a server 105. The network 104 serves as a medium providing a communication link between the terminal devices 101, 102 and 103 and the server 105. The network 104 may include various types of connections, such as wired or wireless communication links, or optical fiber cables.

A user may interact with the server 105 using the terminal devices 101, 102 and 103 through the network 104 to receive or send messages, or the like. The terminal devices 101, 102 and 103 may be installed with various communication client applications, such as image processing applications, video applications, live broadcast applications, instant messaging tools, e-mail clients, and social platform software.

The terminal devices 101, 102 and 103 here may be hardware or software. When the terminal devices 101, 102 and 103 are hardware, the terminal device may be various electronic devices with display screens, including but not limited to a smart phone, a tablet computer, an e-book reader, a laptop portable computer, a desktop computer, etc. When the terminal devices 101, 102 and 103 are software, the terminal device may be installed in the above-listed electronic devices. The terminal devices may be implemented as a plurality of software programs or software modules (e.g., software programs or software modules for providing distributed services), or as a single software program or software module, Specific limitations are not provided here.

The server 105 may be a server providing various services, for example, a background server providing a support for the terminal devices 101, 102 and 103. The background server may process, for example, analyze the received data such as an image or a feature map of the image, and feed the processing result (for example, the location of a target object in the image) back to the terminal device.

It should be noted that the method for processing an image according to the embodiments of the present disclosure may be performed by the server 105 or the terminal devices 101, 102 and 103. Accordingly, the apparatus for processing an image may be provided in the server 105 or the terminal devices 101, 102 and 103.

It should be understood that the numbers of the terminal devices, the network and the server in FIG. 1 are merely illustrative. Any number of terminal devices, networks and servers may be provided based on actual requirements.

Figure 2:
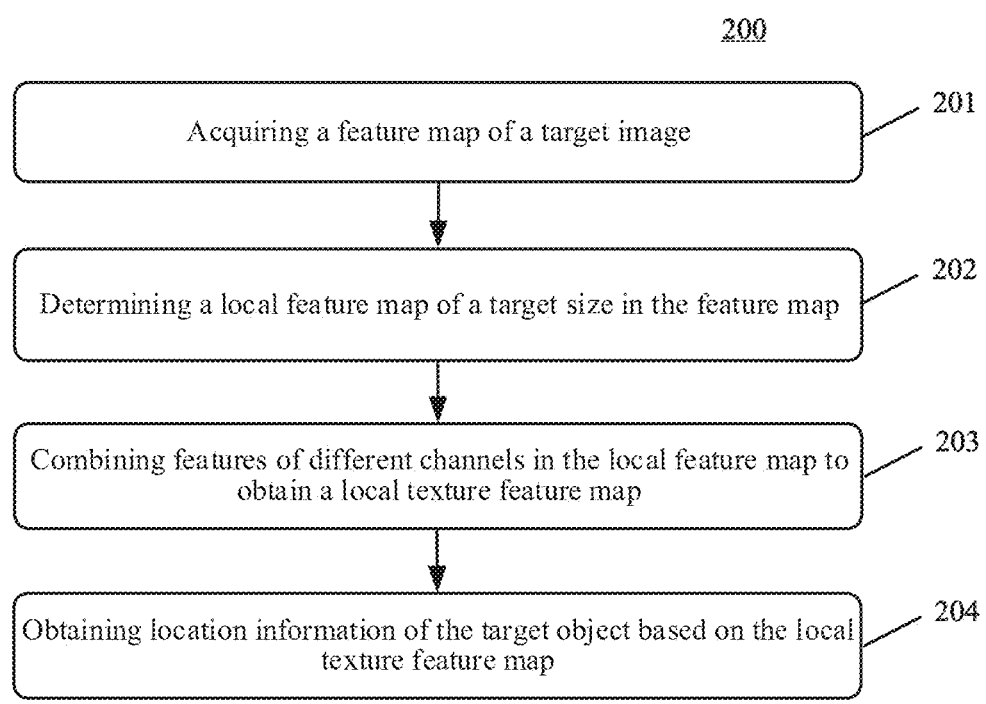
FIG. 2 is a flowchart of a method for processing an image according to an embodiment of the present disclosure.

Further, referring to FIG. 2, a flow 200 of an embodiment of a method for processing an image according to the present disclosure is shown. The method for processing an image includes the following steps.

Step 201: acquiring a feature map of a target image, where the target image contains a target object.

In the present embodiment, the executing body (for example, the server or terminal device shown in FIG. 1) of the method for processing an image may acquire the feature map of the target image. Specifically, the executing body may acquire the feature map in various ways. For example, the executing body may acquire a target image and input the target image into a deep neural network for detecting an object, such as a deeplab or a Pyramid Scene Parsing Network (PSPnet), to obtain a feature map output by a convolutional layer of the deep neural network. In addition, the executing body may alternatively acquire the existing feature map locally or from other electronic device. The target object may be any set object, such as human body or face, or each target in the target image.

In practice, the executing body or other electronic device may generate a feature map including three channels (an R channel, a G channel, and a B channel) according to the color value of each pixel contained in the target image, where each channel corresponds to a feature matrix, and the elements therein are color values of corresponding colors.

In some alternative implementations of the present embodiment, step 201 may include: inputting the target image into a pre-trained deep neural network, and using the output of a target convolutional layer of the deep neural network as the feature map.

In these alternative implementations, the deep neural network here may include one or more convolutional layers. The executing body may use any one of these convolutional layers as a target convolutional layer, and use the feature map output by the target convolutional layer as a feature map of the target image.

In these implementations, the technical solution combining the features of the channels may be flexibly applied to an optional target convolutional layer, without being constrained to a fixed convolutional layer, so that the technical solution may be applied more widely.

Step 202: determining a local feature map of a target size in the feature map.

In the present embodiment, the executing body may determine the local feature map of the target size in the feature map. The executing body may determine the local feature map in various ways. For example, the executing body may set a window to a target size by slide the window, and sliding in the feature map using the window. Each time the window is slidden to a place of the feature map, the region framed by the window is used as a local feature map. In addition, the executing body may also divide the feature map into a plurality of local feature maps of a target size by means of dividing. The target size here may be represented by length and width, for example, how many pixels correspond to the length and width respectively, or length values corresponding to the length and width respectively.

Step 203: combining features of different channels in the local feature map to obtain a local texture feature map.

In the present embodiment, the executing body may combine the features of different channels in the local feature map into the local texture feature map. In practice, the executing body may combine the features in various ways. For example, the executing body may add, for the feature of each channel in the local feature map, the features of respective channels to the feature of the channel to obtain combined features of the channel. In this way, the executing body may obtain the combined features of each channel of the local feature map, and stitch the combined features of each channel to obtain a local texture feature map.

Step 204: obtaining location information of the target object based on the local texture feature map.

In the present embodiment, the executing body may determine the location of the target object based on the obtained local texture feature map. In practice, the executing body may directly obtain the location of the target object by using each local texture feature map. For example, the executing body may input the local texture feature map corresponding to each local feature map in the feature map to a feature processing layer of the deep neural network for subsequent processing. For example, the feature processing layer may be a convolutional layer or a fully connected layer. Finally, the location of the target object output by the deep neural network is obtained.

In some alternative implementations of the present embodiment, step 204 may include: combining, for each local feature map of the feature map, the local texture feature maps corresponding to respective local feature maps to obtain a combined feature map; and inputting the combined feature map into a fully connected layer or a convolutional layer in a pre-trained deep neural network to obtain the location of the target object.

In these alternative implementations, the executing body may stitch the local texture feature maps corresponding to the respective local feature maps to obtain a combined feature map corresponding to the whole feature map. Thereafter, the executing body inputs the combined feature map into a feature processing layer of the deep neural network to obtain the location of the target object output by the deep neural network. Specifically, the executing body may combine the local texture feature maps corresponding to the respective local feature maps according to the locational relationship between the local feature maps. The number of pixels in the combined feature map is identical to the number of pixels in the feature map obtained from the target image.

In these implementations, the local texture feature maps corresponding to the respective local feature maps may be stitched to obtain a combined feature map corresponding to the whole target image, so that associated features between the local feature maps may be better obtained.

Figure 3:
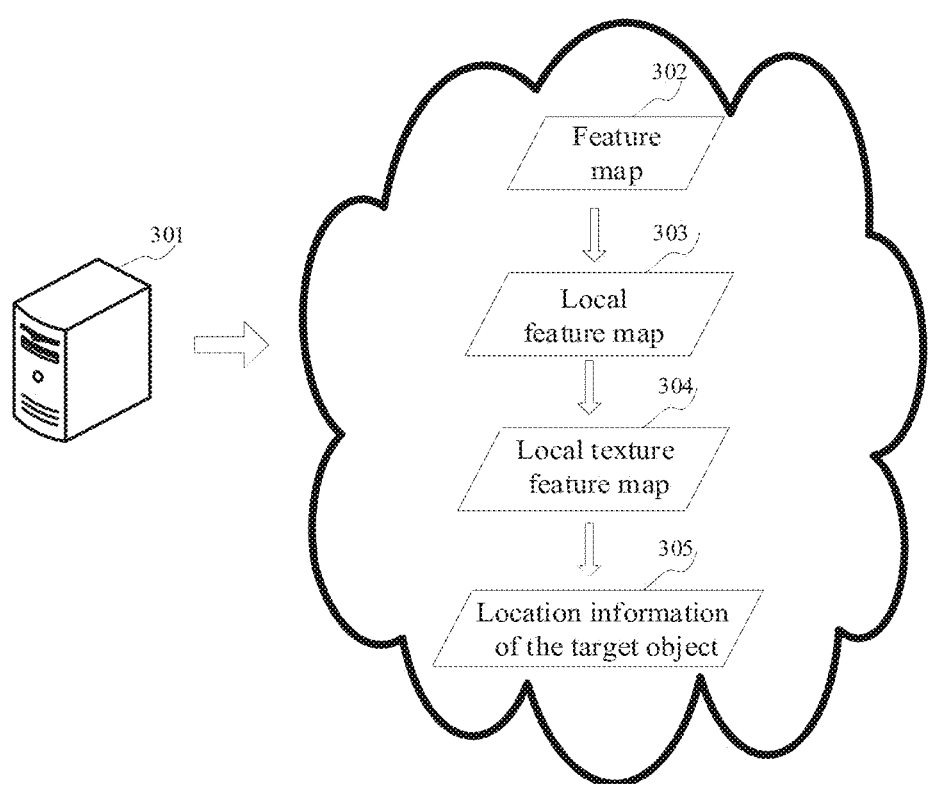
FIG. 3 is a schematic diagram of an application scenario of the method for processing an image according to an embodiment of the present disclosure.

Further, refer to FIG. 3, which is a schematic diagram of an application scenario of the method for processing an image according to the present embodiment. In the application scenario of FIG. 3, the executing body 301 may acquire a feature map 302 of a target image, where the target image contains a target object, i.e., a face; determine a local feature map 303 of a target size in the feature map 302; combine features of different channels in the local feature map 303 to obtain a local texture feature map 304; and obtain location information 305 of the face based on the local texture feature map 304.

The method provided by the embodiment of the present disclosure may combine the features of different channels, so that the features of respective channels can be fused, and the fused features are richer and may better reflect the characteristics of the image. Therefore, more accurate detection results may be obtained by using the combined features.

Figure 4:
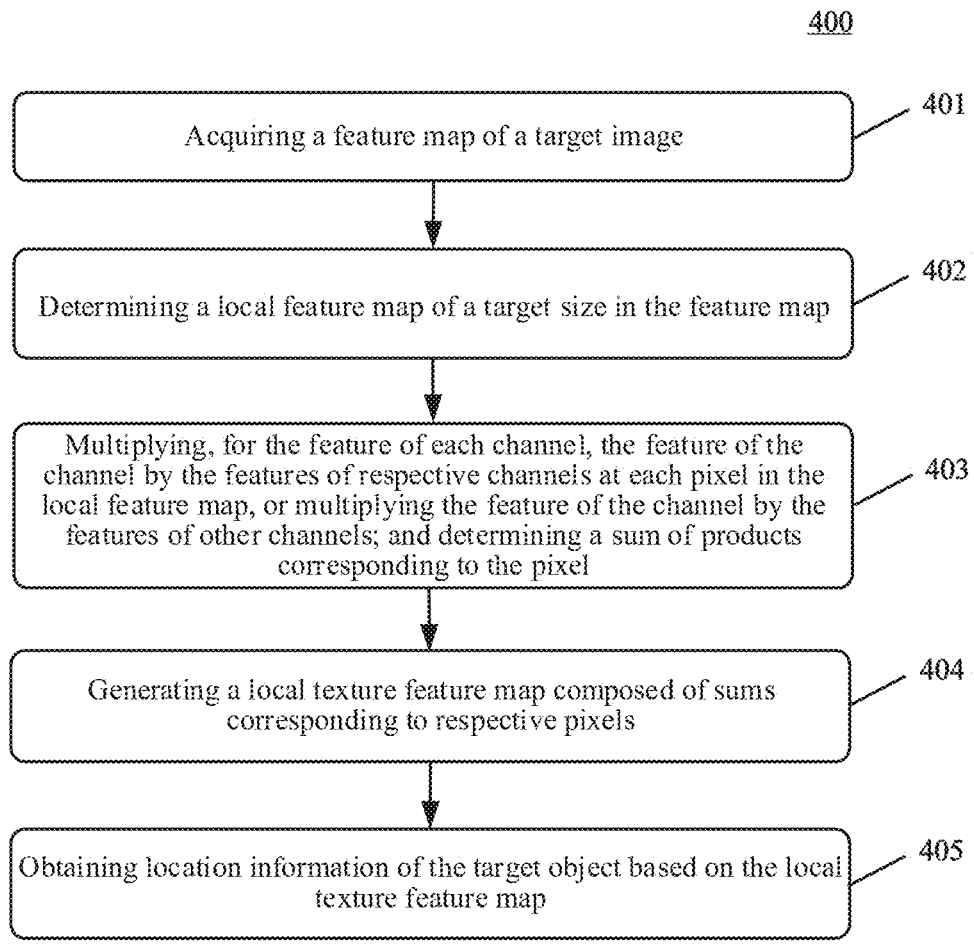
FIG. 4 is a flowchart of the method for processing an image according to another embodiment of the present disclosure.

Further, referring to FIG. 4, a flow 400 of the method for processing an image according to another embodiment is shown. The flow 400 of the method for processing an image includes the following steps.

Step 401: acquiring a feature map of a target image, where the target image contains a target object.

In the present embodiment, the executing body (for example, the server or terminal device shown in FIG. 1) of the method for processing an image may acquire the feature map of the target image. Specifically, the executing body may acquire the feature map in various ways.

Step 402: determining a local feature map of a target size in the feature map.

In the present embodiment, the executing body may determine local feature maps of at least two target sizes in the feature map. The executing body may determine the local feature map in various ways. For example, the executing body may set a window to a target size by slide the window, and sliding in the feature map using the window. Each time the window is slidden to a place of the feature map, the region framed by the window is used as a local feature map. In addition, the executing body may also divide the feature map into a plurality of local feature maps by means of dividing.

Step 403: multiplying, for the feature of each channel, the feature of the channel by the features of respective channels at each pixel in the local feature map, or multiplying the feature of the channel by the features of other channels; and determining a sum of products corresponding to the pixel.

In the present embodiment, the executing body may multiply, for the feature of each channel of each pixel in the local feature map, the feature of the channel by the features of respective channels of the pixel to obtain a combined feature of the channel. Here, the feature of the channel may be included in the features of the respective channels. Alternatively, the executing body may multiply the feature of the channel by the features of other channels of the pixel to obtain a combined feature of the channel.

For example, the executing body may obtain a feature map $F^l$ by using the l layer of a deep neural network, the number of channels of $F^l$ being $N^l$. The executing body determines a local feature map $f^l$ having a window size of (h,w) in the feature map $F^l$, where h is the height, and w is the width. The local feature map $f^l$ may be expressed as $N^l \times h \times w$.

The local feature map may be expressed as $N^l$ features having sizes of h×w, for example, 3 channels correspond to 3 features having sizes of h×w, respectively. The executing body may multiply, for the corresponding feature of each channel in the local feature map, the feature of the channel by the features of respective channels at each pixel, or multiply the feature of the channel by the features of other channels.

The executing body may sum, for each pixel of the local feature map, all the products obtained at the pixel, where the obtained sum may be denoted by $g_{c,c'}^l$. For example, the 3 channels of each pixel correspond to a total of 9 products, and the 9 products may be summed.

A local texture operator used to calculate the products and the sum for the local feature map may be expressed as $g_{c,c'}^l = \Sigma f_c^l \times f_{c'}^l$, where $f_c^l$ and $f_{c'}^l$ are respectively the features of the c channel and the c' channel in the $f^l$.

Step 404: generating a local texture feature map composed of sums corresponding to respective pixels.

In the present embodiment, the executing body may generate the local texture feature map composed of respective sums, which is a matrix having a size of $N^l \times N^l$, each element of the local texture feature map being one of the obtained sums. In this way, the size of the local feature map $f^l$ is converted into $N^l \times N^l$.

In practice, for each pixel in the feature map $N^l \times H \times W$ of the target image, a local feature map h×w composed of the pixel and surrounding pixels may be determined. The feature of $N^l \times 1$ is converted into the local texture feature of $N^{l^2} \times 1$ by using local feature information of the local feature map through the local texture operator. For each pixel of the feature map of the target image, the same local texture feature calculation is performed to convert the input feature map $N^l \times H \times W$ into $N^{l^2} \times H \times W$.

In the present embodiment, the features of different channels of each pixel may be multiplied, so that the features of different channels can be better fused. In this way, the feature information of the obtained local texture feature map is richer and better reflects the characteristics of each pixel of the image.

Step 405: obtaining location information of the target object based on the local texture feature map.

In the present embodiment, the executing body may obtain the location of the target object based on the obtained local texture feature map. In practice, the executing body may directly obtain the location of the target object by using each local texture feature map. For example, the executing body may input the local texture feature map corresponding to each local feature map in the feature map to a feature processing layer of the deep neural network for subsequent processing.

In some alternative implementations of the present embodiment, step 405 may include: processing the local texture feature map through a pre-trained deep neural network to obtain location information of a region composed of pixels where the target object is located, where the deep neural network is used to characterize the corresponding relationship between the target image and the location information of the region composed of pixels where the target object contained in the target image is located.

In these alternative implementations, the executing body may process the local texture feature map by using the deep neural network segmented at pixel levels to implement pixel-by-pixel segmentation of the target image. The deep neural network may characterize the corresponding relationship between the target image and the location information of the target object contained in the target image. The location information predicted by the deep neural network is accurate to pixels.

These implementations can fuse the features of different channels of each pixel to obtain a local texture feature map, thereby enhancing the capability of the existing semantic segmentation network to express pixel textures, and improving the detection accuracy of each pixel by the deep neural network.

In some alternative application scenarios of any of the foregoing implementations, the deep neural network includes a combined processing layer; step 402 may include: performing the step 402 by using the combined processing layer; and step 403 may include: performing the step 403 by using the combined processing layer.

In these alternative application scenarios, the deep neural network may include an independent layer: the combined processing layer. The executing body may perform steps 402 and 403 by using the combined processing layer. The combined processing layer may include an operator for implementing steps 402 and 403.

In these application scenarios, the combined processing layer may be embedded in the architecture of the deep neural network to implement feature fusion of channels.

Figure 5:
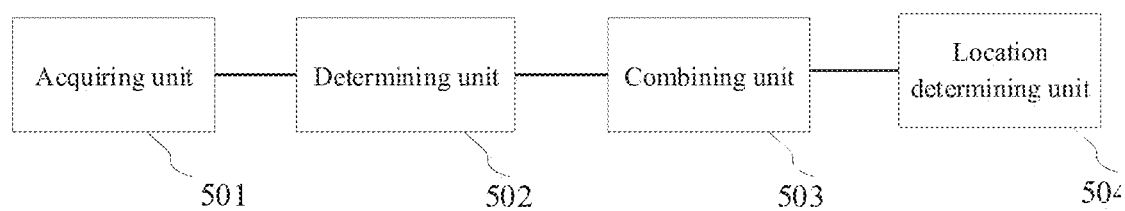
FIG. 5 is a schematic structural diagram of an apparatus for processing an image according to an embodiment of the present disclosure.

With further reference to FIG. 5, as an implementation of the method shown in the above figures, an embodiment of the present disclosure provides an apparatus for processing an image. The embodiment of the apparatus corresponds to the embodiment of the method shown in FIG. 2, and the apparatus may be applied to various electronic devices.

As shown in FIG. 5, the apparatus 500 for processing an image according to the present embodiment includes an acquiring unit 501, a determining unit 502, a combining unit 503, and a location determining unit 504. The acquiring unit 501 is configured to acquire a feature map of a target image, where the target image contains a target object; the determining unit 502 is configured to determine a local feature map of a target size in the feature map; the combining unit 503 is configured to combine features of different channels in the local feature map to obtain a local texture feature map; and the location determining unit 504 is configured to obtain location information of the target object based on the local texture feature map.

In some embodiments, the acquiring unit 501 of the apparatus 500 for processing an image may acquire the feature map of the target image. Specifically, the executing body may acquire the feature map in various ways. For example, the executing body may acquire a target image and input the target image into a deep neural network for detecting an object.

In some embodiments, the determining unit 502 determines the local feature map of the target size in the feature map. The executing body may determine the local feature map in various ways. For example, the executing body may set a window to a target size by slide the window, and sliding in the feature map using the window. Each time the window is slidden to a place of the feature map, the region framed by the window is used as a local feature map.

In some embodiments, the combining unit 503 combines the features of different channels in the local feature map into a local texture feature map. In practice, the executing body may combine the features in various ways.

In some embodiments, the location determining unit 504 may determine the location of the target object based on the obtained local texture feature map. In practice, the executing body may directly obtain the location of the target object by using each local texture feature map. For example, the executing body may input the local texture feature map corresponding to each local feature map in the feature map to a feature processing layer of the deep neural network for subsequent processing.

In some alternative implementations of the present embodiment, the combining unit includes: a first module configured to multiply, for the feature of each channel, the feature of the channel by the features of respective channels at each pixel in the local feature map, or multiply the feature of the channel by the features of other channels, and determine a sum of products corresponding to the pixel; and a second module configured to generate the local texture feature map composed of sums corresponding to respective pixels.

In some alternative implementations of the present embodiment, the location determining unit is further configured to: process the local texture feature map through a pre-trained deep neural network to obtain location information of a region composed of pixels where the target object is located in the target image, where the deep neural network is used to characterize the corresponding relationship between the target image and the location information of the region composed of pixels where the target object contained in the target image is located.

In some alternative implementations of the present embodiment, the deep neural network includes a combined processing layer; the determining unit is further configured to: determine the local feature map of the target size in the feature map by using the combined processing layer; and the combining unit is further configured to: combine the features of different channels in the local feature map by using the combined processing layer to obtain a local texture feature map.

In some alternative implementations of the present embodiment, the acquiring unit is further configured to: input the target image into the pre-trained deep neural network, and use the output of a target convolutional layer of the deep neural network as a feature map.

Figure 6:
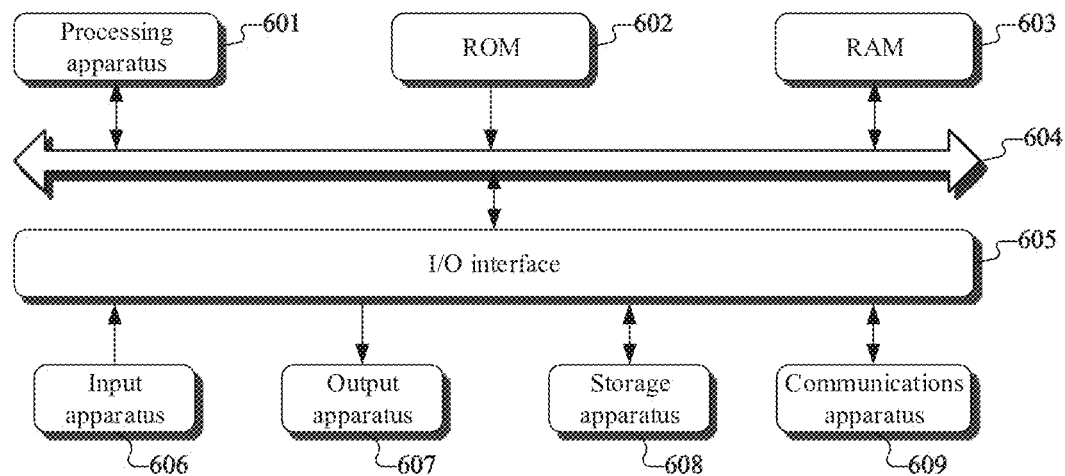
FIG. 6 is a schematic structural diagram of a computer system adapted to implement an electronic device of some embodiments of the present disclosure.

As shown in FIG. 6, the electronic device 600 may include a processing apparatus 601 (such as a central processing unit, a graphics processing unit, or the like), which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the system 600. The CPU 601, the ROM 602 and the RAM 603 are connected to each other through a bus 604. An input/output (I/O) interface 505 is also connected to the bus 604.

Generally, the following components are connected to the I/O interface 605: an input apparatus 606 including a touch screen, touch pad, keyboard, mouse, camera, microphone, accelerometer, gyroscope and the like; an output apparatus 607 including a liquid crystal display (LCD), a speaker, a vibrator and the like; a storage apparatus 608 including a hard disk and the like; and a communication portion 609 including a network interface card, such as a LAN card and a modem. The communication apparatus 609 performs communication processes via a network, such as the Internet. Although FIG. 6 shows an electronic device 600 having various apparatus, it should be understood that it is not required to implement or have all the apparatus shown. More or fewer apparatus may be implemented or provided instead. Each block shown in FIG. 6 may represent one apparatus, and may alternatively represent multiple apparatus as required.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by software or may be implemented by hardware. The described units may also be provided in a processor, for example, described as: a processor including an acquiring unit, a determining unit, a combining unit, and a location determining unit. The names of the units do not constitute a limitation to such units themselves in this case. For example, the acquiring unit may be further described as "a unit configured to a feature map of a target image."

In another aspect, an embodiment of the present disclosure further provides a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: acquire a feature map of a target image, where the target image contains a target object; determine a local feature map of a target size in the feature map; combine features of different channels in the local feature map to obtain a local texture feature map; and obtain location information of the target object based on the local texture feature map.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, comprising:
   acquiring a feature map of a target image, wherein the target image contains a target object;
   determining a local feature map of a target size in the feature map;
   combining features of different channels in the local feature map to obtain a local texture feature map; and
   obtaining location information of the target object based on the local texture feature map,
   wherein:
   the obtaining location information of the target object based on the local texture feature map comprises: processing the local texture feature map through a pre-trained deep neural network to obtain location information of a region composed of pixels where the target object is located in the target image, the deep neural network being used to characterize the corresponding relationship between the target image and the location information of the region composed of pixels where the target object contained in the target image is located,
   the deep neural network comprises a combined processing layer,
   the determining a local feature map of a target size in the feature map comprises: determining the local feature map of the target size in the feature map by using the combined processing layer, and
   the combining features of different channels in the local feature map to obtain a local texture feature map comprises: combining the features of different channels in the local feature map by using the combined processing layer to obtain the local texture feature map.

2. The method according to claim 1, wherein the combining features of different channels in the local feature map to obtain a local texture feature map comprises:
   multiplying, for a feature of each channel, the feature of the channel by the features of respective channels at each pixel in the local feature map, or multiplying the feature of the channel by features of other channels; determining a sum of products corresponding to the pixel; and
   generating the local texture feature map composed of sums corresponding to respective pixels.

3. The method according to claim 1, wherein the acquiring a feature map of a target image comprises:
   inputting the target image into the pre-trained deep neural network, and using an output of a target convolutional layer of the deep neural network as the feature map.

4. An apparatus for processing an image, comprising:
   at least one processor; and
   a memory storing instructions, wherein the instructions when executed by the at least one processor, cause the at least one processor to perform operations, the operations comprising:
   acquiring a feature map of a target image, wherein the target image contains a target object;
   determining a local feature map of a target size in the feature map;
   combining features of different channels in the local feature map to obtain a local texture feature map; and
   obtaining location information of the target object based on the local texture feature map,
   wherein:
   the obtaining location information of the target object based on the local texture feature map comprises: processing the local texture feature map through a pre-trained deep neural network to obtain location information of a region composed of pixels where the target object is located in the target image, the deep neural network being used to characterize the corresponding relationship between the target image and the location information of the region composed of pixels where the target object contained in the target image is located,
   the deep neural network comprises a combined processing layer,
   the determining a local feature map of a target size in the feature map comprises: determining the local feature map of the target size in the feature map by using the combined processing layer, and
   the combining features of different channels in the local feature map to obtain a local texture feature map comprises: combining the features of different channels in the local feature map by using the combined processing layer to obtain the local texture feature map.

5. The apparatus according to claim 4, wherein the combining features of different channels in the local feature map to obtain a local texture feature map comprises:
- multiplying, for a feature of each channel, the feature of the channel by the features of respective channels at each pixel in the local feature map, or multiplying the feature of the channel by the features of other channels, and determining a sum of products corresponding to the pixel; and
- generating the local texture feature map composed of sums corresponding to respective pixels.

6. The apparatus according to claim 4, wherein the acquiring a feature map of a target image comprises:
- inputting the target image into the pre-trained deep neural network, and using an output of a target convolutional layer of the deep neural network as the feature map.

7. A non-transitory computer-readable storage medium, storing a computer program thereon, wherein the computer program, when executed by a processor, causes the processor to perform operations, the operations comprising:
- acquiring a feature map of a target image, wherein the target image contains a target object;
- determining a local feature map of a target size in the feature map;
- combining features of different channels in the local feature map to obtain a local texture feature map; and
- obtaining location information of the target object based on the local texture feature map,
- wherein:
  - the obtaining location information of the target object based on the local texture feature map comprises: processing the local texture feature map through a pre-trained deep neural network to obtain location information of a region composed of pixels where the target object is located in the target image, the deep neural network being used to characterize the corresponding relationship between the target image and the location information of the region composed of pixels where the target object contained in the target image is located,
  - the deep neural network comprises a combined processing layer,
  - the determining a local feature map of a target size in the feature map comprises: determining the local feature map of the target size in the feature map by using the combined processing layer, and
  - the combining features of different channels in the local feature map to obtain a local texture feature map comprises: combining the features of different channels in the local feature map by using the combined processing layer to obtain the local texture feature map.

8. The non-transitory computer-readable storage medium according to claim 7, wherein the combining features of different channels in the local feature map to obtain a local texture feature map comprises:
- multiplying, for a feature of each channel, the feature of the channel by the features of respective channels at each pixel in the local feature map, or multiplying the feature of the channel by the features of other channels, and determining a sum of products corresponding to the pixel; and
- generating the local texture feature map composed of sums corresponding to respective pixels.

9. The non-transitory computer-readable storage medium according to claim 7, wherein the acquiring a feature map of a target image comprises:
- inputting the target image into the pre-trained deep neural network, and using an output of a target convolutional layer of the deep neural network as the feature map.

* * * * *